Nov. 6, 1934.  W. F. HEINEMAN  1,979,799
CONVEYER MECHANISM
Filed Dec. 18, 1933   2 Sheets-Sheet 1
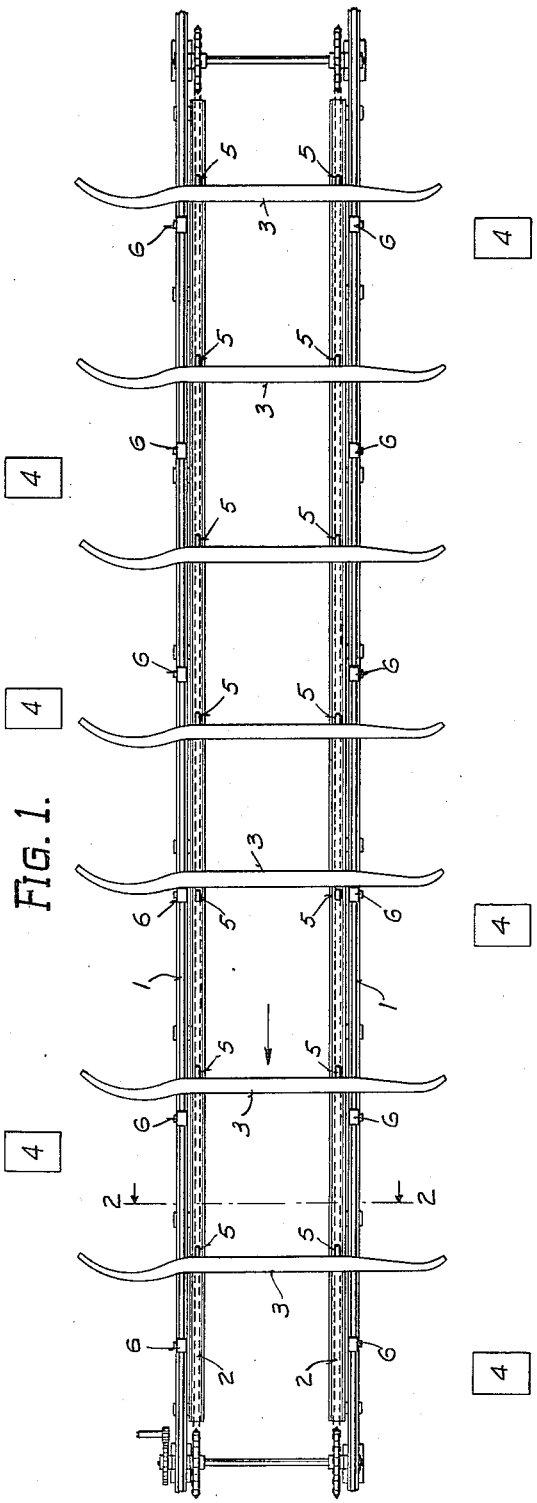
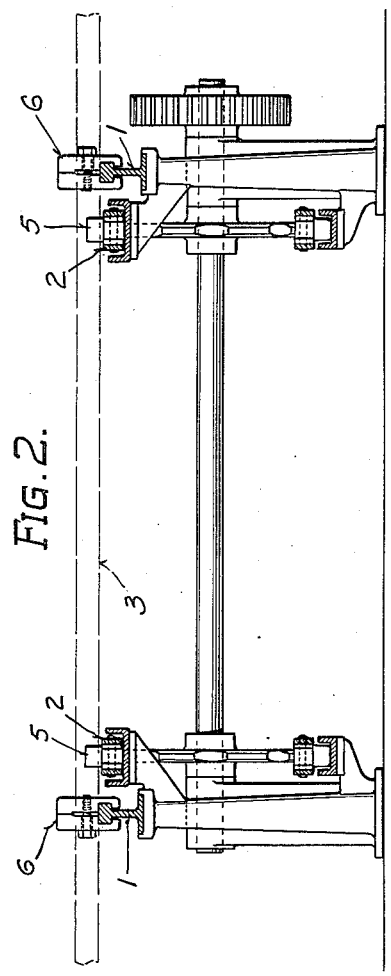
INVENTOR.
Warren F. Heineman
BY
ATTORNEY.

Patented Nov. 6, 1934

1,979,799

UNITED STATES PATENT OFFICE 1,979,799

CONVEYER MECHANISM

Warren F. Heineman, Shorewood, Wis., assignor to A. O. Smith Corporation, Milwaukee, Wis., a corporation of New York Application December 18, 1933, Serial No. 702,840

5 Claims. (Cl. 198—19)

This invention relates to a conveyer mechanism and is particularly adapted for conveying articles along a predetermined path and for stopping the articles at predetermined locations along the path.

The object of the invention is to provide a simple and inexpensive conveyer mechanism.

Another object is to provide a conveyer which will be continuously operating, but which, at the same time, will effect stopping of the articles being conveyed at predetermined locations.

Other objects and advantages will be pointed out hereinafter.

The accompanying drawings illustrate the preferred embodiment of the invention and the views are as follows:

Figure 1 is a top plan view of the conveyer mechanism.

Fig. 2 is an enlarged transverse sectional view taken on the line 2—2 of Fig. 1.

Figure 3:
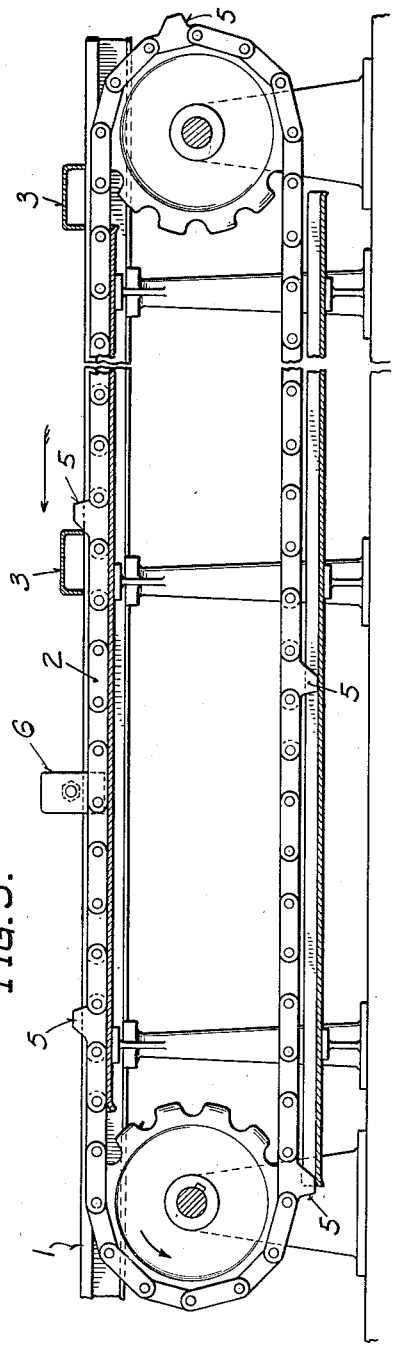
Fig. 3 is an enlarged longitudinal sectional view of a part of the mechanism.

The conveyer mechanism comprises, in general, two parallel tracks 1, preferably horizontal, and a pair of endless conveyer chains 2, one arranged adjacent each track.

The tracks 1 constitute, in effect, skids upon which the articles 3 are pushed along. The articles 3 illustrated are channel bars which extend across the tracks and are adapted to be moved along the tracks. Where the channel bars 3 are in the course of fabrication into side bars for automobile frames, for instance, various machine and riveting operations must be performed upon them. For this purpose, machines 4 are located at convenient points along and on opposite sides of the conveyer tracks.

The bars 3 are pushed along the tracks 1 by means of push blocks 5 arranged at predetermined spaced intervals on the endless chains 2. The blocks 5 extend above the upper plane or level of the tracks 1 and are caused to engage bars 3 as the chains 2 are moved along the tracks.

As a bar 3 comes to position adjacent an operator of a machine 4, the operator removes the bar from the tracks and carries out the desired machining or riveting operation on the bar and then replaces the bar on the tracks where it is pushed along to the position of the next machine and operator. It is not always possible for all of the operators to perform their work in the desired synchronism and in some instances the bar may be conveyed beyond the desired location on the tracks before the particular operator is ready to take it off from the tracks.

To overcome this difficulty, the present invention provides a very simple means for effecting stopping of the article at the desired location adjacent each machine without stopping the conveyer chains 2. To this end a stop 6 is provided on each track or rail at the desired location for stopping the article adjacent each machine. The stops 6 are adjustably mounted on the tracks so that they will stop the articles at any desired location for different machines. The stops 6 extend vertically upward on the tracks, a sufficient height to prevent further movement of the article along the tracks except that the articles be lifted over the stops and placed on the tracks on the other side.

Figure 4:
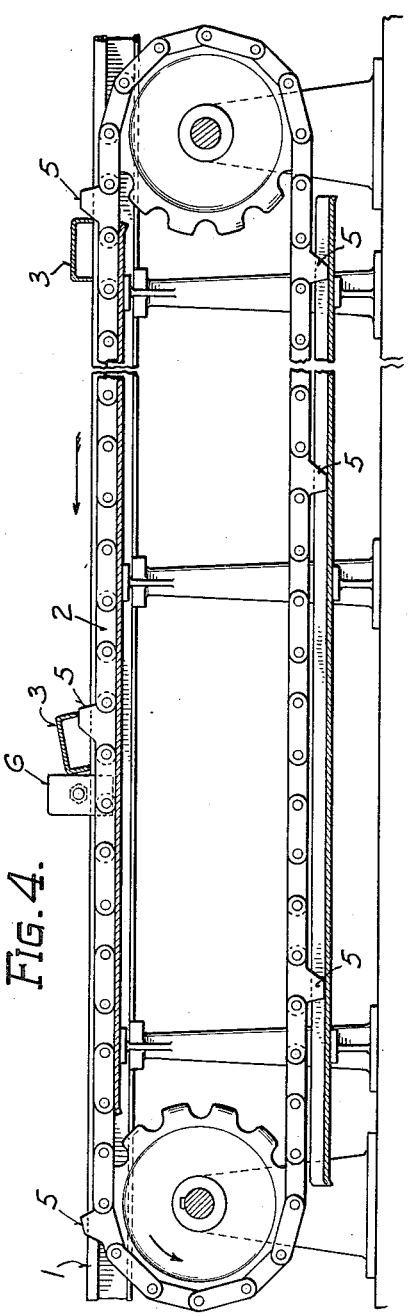
Fig. 4 is a view similar to Fig. 3 showing the mechanism at a different position in its operation.

In order to provide for continuous operation of the chains 2, the push blocks 5 have their forward sides inclined sufficiently to cause the article 3, when it engages stops 6, as shown in Fig. 4, to rise and allow the blocks 5 to pass beneath, after which the article 3 drops back to the tracks 1 and remains adjacent the stops 6 until an operator lifts it off the tracks. When the operator has completed an operation on the article 3, he places it on the tracks on the left-hand side of the stops 6 where it is again pushed along the tracks by the push blocks 5 until it reaches the next pair of stops 6.

The inclination of the forward side of the push blocks 5 will depend upon the work at hand and also upon whether the conveyer tracks are horizontal. It should be sufficiently steep to overcome the friction in pushing the articles 3 along the tracks. On the other hand, it should be of sufficiently gradual acclivity to facilitate raising of the articles at the respective stops.

The stops 6 may be positioned so as to stop the article at any desired angle for the operator and need not require that the article be stopped at right angles to the conveyer. This is further facilitated by providing two chains 2, one adjacent each rail. By providing rails to carry the articles thereby freeing the chains of any load, a very simple and efficient conveyer is obtained, and one which will not require constant repair and adjustment.

Various embodiments of the invention may be employed within the scope of the claims.

I claim:

1. A conveyer mechanism comprising a skid for receiving and conveying articles along a predetermined path, a stop adjustably mounted on the skid to prevent further movement of an article along the skid until the article is operated upon, and constantly moving means normally below the level of said skid top having a plurality of spaced upwardly extending push blocks projecting above the level of said skid top for engaging articles on the skid and moving the articles therealong, the push blocks being adapted to pass beneath the articles when the latter engage a stop preventing their further movement along the skid.

2. A conveyer mechanism comprising a skid for receiving and conveying articles along a predetermined path, a stop adjustably mounted on the skid to prevent further movement of an article along the skid until the article is operated upon, and constantly moving means having a plurality of spaced upwardly extendnig push blocks for engaging articles on the skid and moving the articles therealong, the push blocks having inclined forward surfaces for raising the articles when the latter engage a stop and allowing the push blocks to then pass underneath the article.

3. In combination, two parallel rails for supporting articles for movement therealong, a plurality of stops extending upwardly from said rails and adjustably mounted thereon at predetermined locations, an endless conveyer having a plurality of spaced upwardly extending push blocks for pushing articles along said rails, and means for effecting relative vertical movement between said push blocks and an article when the latter engages a stop to allow said push blocks to pass beneath the article and continue their movement unobstructed while the article is stopped at the location determined by the stop.

4. In combination, two parallel rails for receiving and supporting articles for movement along a predetermined path, a plurality of stops extending upwardly from said rails and adjustably mounted thereon at predetermined locations, and an endless conveyer adjacent each rail having a plurality of spaced upwardly extending push blocks for pushing articles along said rails, said blocks having inclined forward faces to effect a raising of an article when the latter engages a stop and allow the passing of the blocks beneath the article while the latter is retained by the stop.

5. In combination, two parallel horizontal rails, a plurality of machines arranged along either side of said rails for performing work on articles conveyed therealong, a plurality of stops extending upwardly from said rails, one stop being provided on each rail adjacent the location of each machine, an endless chain arranged adjacent each rail for continuous movement therealong in one direction and a plurality of spaced push blocks extending upwardly from each chain above the top level of the rails for pushing articles successively along said rails, said push blocks having inclined forward faces for effecting raising of the articles as they engage successive stops along the tracks and allowing the blocks to pass beneath the articles unobstructed.

WARREN F. HEINEMAN.